(12) United States Patent
Xiong

(10) Patent No.: US 10,476,399 B1
(45) Date of Patent: *Nov. 12, 2019

(54) FREQUENCY CONTROL METHOD FOR SELF-OSCILLATING CIRCUIT

(71) Applicant: UNIVERSAL LIGHTING TECHNOLOGIES, INC., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,523

(22) Filed: Sep. 26, 2018

Related U.S. Application Data

(60) Provisional application No. 62/565,612, filed on Sep. 29, 2017.

(51) Int. Cl.
*H02M 3/338* (2006.01)

(52) U.S. Cl.
CPC ....... *H02M 3/3385* (2013.01); *H02M 3/3381* (2013.01)

(58) Field of Classification Search
CPC ........... H02M 3/335–42; Y02B 20/142; Y02B 20/185; Y02B 20/348; Y02B 70/1433
See application file for complete search history.

(56) References Cited

U.S. PATENT DOCUMENTS 9,837,913 B1 * 12/2017 Xiong ................ H05B 33/0851
10,098,194 B1   10/2018 Xiong

| | | |
|---|---|---|
| 2015/0103562 A1 | 4/2015 | Yeh et al. |
| 2017/0093296 A1 | 3/2017 | Chen |
| 2017/0187298 A1 | 6/2017 | Lin |
| 2017/0222565 A1 | 8/2017 | Sonobe |
| 2018/0262118 A1 | 9/2018 | Ouyang |

OTHER PUBLICATIONS

International Rectifier. "IRS27951S, IRS27952(4)S". Aug. 27, 2015, pp. 1-29. (Year: 2015).*

* cited by examiner

*Primary Examiner* — Kyle J Moody
*Assistant Examiner* — Peter M Novak
(74) *Attorney, Agent, or Firm* — Patterson Intellectual Property Law, P.C.; Gary L. Montle; Jerry Turner Sewell

(57) ABSTRACT

A DC-to-AC inverter provides an AC voltage to the primary winding of an output isolation transformer having at least one secondary winding. An AC output voltage from the secondary winding is rectified to generate a DC voltage, which is applied to a load. The magnitude of a current flowing through the load is sensed and compared to a reference magnitude to produce a feedback signal. The feedback signal controls a voltage superposition circuit, which produces a superposition voltage. The superposition voltage is applied to an input node of a current control circuit. The current control circuit responds to the superposition voltage to vary a magnitude of a control current to a switching controller in the DC to-AC inverter. The switching controller is responsive to the control current magnitude to vary the frequency of the AC voltage and to thereby vary the load current.

6 Claims, 3 Drawing Sheets

FREQUENCY CONTROL METHOD FOR SELF-OSCILLATING CIRCUIT

CROSS-REFERENCE TO RELATED APPLICATION

This application claims the benefit under 35 U.S.C. § 119(e) of U.S. Provisional Application No. 62/565,612, filed Sep. 29, 2017, entitled "Frequency Control Method for Self-Oscillating Circuit," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to power supplies that provide a DC current to a load such as light-emitting diodes. More particularly, the present disclosure relates to an apparatus and a method for sensing current through the load to provide feedback to the power supply to enable the power supply to maintain a substantially constant current through the load.

BACKGROUND

A DC-to-DC converter drives a DC load such as one or more light-emitting diodes (LEDs) or the like. The converter includes a DC-to-AC inverter in a primary circuit. The inverter generates a switched AC voltage, which is applied to the primary winding of an isolation transformer. A secondary winding provides an input to an AC-to-DC rectifier in a secondary circuit. The rectifier produces a DC voltage, which is applied to the load. The magnitude of a load current flowing through the load is sensed and compared to a reference magnitude. An operational amplifier or other comparator in the secondary circuit generates a feedback signal in response to a difference between the sensed current magnitude and the reference magnitude. The feedback signal is applied to an optocoupler having an input stage in the secondary circuit and having an output stage in the primary circuit. The output stage of the optocoupler has a variable impedance that is coupled to a current control circuit by an impedance control circuit. The current control circuit controls a frequency control current flowing from a control terminal of a switch controller integrated circuit in the DC-to-AC inverter. The variable impedance modifies the frequency control current. The switch controller is responsive to the frequency control current to vary the frequency of the switched AC voltage. Varying the frequency of the AC voltage varies the magnitude of the load current. In some circumstances, the impedance control circuit is highly sensitive to small changes in the impedance of the output stage of the optocoupler such that the load current may change during normal operation and cause the light produced by the LEDs to flicker.

BRIEF SUMMARY

Accordingly, a need exists for improvements to the DC-to-DC converter to reduce the sensitivity of the frequency control current to changes in the impedance of the output stage of the optocoupler that couples the feedback signal from the secondary circuit to the primary circuit.

One aspect of the embodiments disclosed herein is a DC-to-AC inverter that provides an AC voltage to the primary winding of an output isolation transformer having at least one secondary winding. An AC output voltage from the secondary winding is rectified to generate a DC voltage, which is applied to a load. The magnitude of a current flowing through the load is sensed and compared to a reference magnitude to produce a feedback signal. The feedback signal controls a voltage superposition circuit, which produces a superposition voltage. The superposition voltage is applied to an input node of a current control circuit. The current control circuit responds to the superposition voltage to vary a magnitude of a control current to a switching controller in the DC-to-AC inverter. The switching controller is responsive to the control current magnitude to vary the frequency of the AC voltage and to thereby vary the load current.

Another aspect of the embodiments disclosed herein is a system for controlling a load current through a DC load. The system comprises a self-oscillating switch driver integrated circuit (IC) having a first driver output and a second driver output coupled to a first semiconductor switch and a second semiconductor switch. The switch driver IC selectively enables the first and second semiconductor switches at a variable frequency to generate a switched voltage signal referenced to a primary circuit ground reference. The switch driver IC varies the variable frequency in response to a current magnitude on a control input. An isolation transformer has a primary winding configured to receive the switched voltage signal. The isolation transformer has at least one secondary winding that generates a secondary AC voltage responsive to the switched voltage signal received by the primary winding. A rectifier circuit is connected to the at least one secondary winding of the isolation transformer to receive the secondary AC voltage. The rectifier circuit is configured to rectify the secondary AC voltage to provide a DC voltage to the load to produce the load current through the DC load. A current sensor senses a magnitude of the load current to generate a sensor voltage responsive to the magnitude of the load current. The magnitude of the load current is responsive to the variable frequency of the switch driver IC. A feedback generator outputs a feedback signal responsive to a difference between the sensor voltage and a reference voltage. The reference voltage represents a desired magnitude of the load current. An optocoupler has an input stage and an output stage. The input stage is coupled to receive the feedback voltage. The output stage has a variable impedance between a first output terminal and a second output terminal responsive to the feedback voltage. A current control circuit has a first resistor and a second resistor connected in series between the control input of the switch driver IC and the primary circuit ground reference. The current control circuit further includes a node between the first resistor and the second resistor. A voltage superposition circuit is connected between a supply voltage and the node of the current control circuit. The voltage superposition circuit includes the output stage of the optocoupler in series with at least one resistor. The voltage superposition circuit is responsive to the feedback voltage received by the input stage to vary the impedance of the output stage to thereby vary a superposition voltage applied to the node of the current control circuit and vary the magnitude of the current on the control input of the switch driver IC.

In certain embodiments in accordance with this aspect, the load current increases when the variable frequency decreases; and the load current decreases when the variable frequency increases.

In certain embodiments in accordance with this aspect, the voltage superposition circuit has at least a first state when the output stage of the optocoupler has a minimum impedance. The voltage superposition circuit has at least a second state when the output stage of the optocoupler has a maximum impedance. The superposition circuit applies a maximum superposition voltage to the node of the current control circuit when the superposition circuit is in the first state. The current control circuit is responsive to the maximum superposition voltage to enable a minimum current to flow out of the control input of the switch driver IC. The superposition circuit applies no superposition voltage to the node of the current control circuit when the superposition circuit is in the second state. The current control circuit is responsive to the absence of the superposition voltage to enable a maximum current to flow out of the control input of the switch driver IC.

In certain embodiments in accordance with this aspect, the switch driver IC is responsive to the minimum current flowing out of the control input to operate at a minimum variable frequency; and the switch driver IC is responsive to the maximum current flowing out of the control input to operate at a maximum variable frequency.

In certain embodiments in accordance with this aspect, the voltage superposition circuit has at least a third state when the output stage of the optocoupler has an impedance between the minimum impedance and the maximum impedance. In the third state, the superposition circuit applies a mid-range superposition voltage to the node of the current control circuit. The mid-range superposition voltage has a magnitude less than the maximum voltage. The current control circuit is responsive to the mid-range superposition voltage to enable a mid-range current to flow out of the control input of the switch driver IC. The switch driver IC is responsive to the mid-range current flowing out of the control input to operate at a mid-range frequency between the maximum variable frequency and the minimum variable frequency.

Another aspect of the embodiments disclosed herein is a method for controlling a load current through a DC load in a secondary circuit. The secondary circuit is isolated from a primary circuit by an isolation transformer. The primary circuit includes a DC-to-AC inverter. The DC-to-AC inverter includes at least a first semiconductor switch and a second semiconductor switch. The two switches are controlled by a switch controller to produce a switched input signal to a primary winding of the isolation transformer. The switch controller controls the first and second semiconductor switches at a variable operating frequency responsive to a magnitude of a control current flowing out of a control terminal of the switch controller. The control current is determined by a current control circuit. The secondary circuit includes a secondary winding of the isolation transformer coupled to an AC-to-DC rectifier. The AC-to-DC rectifier provides the load current at a magnitude responsive to the switching frequency. The method comprises sensing the load current to generate a sensed load current magnitude. The method further comprises comparing the sensed load current magnitude to a target load current magnitude. The method further comprises generating a feedback signal responsive to a difference between the sensed load current magnitude and the target load current magnitude. The method further comprises applying the feedback signal to a voltage superposition circuit to generate a superposition voltage responsive to the feedback signal. The method further comprises applying the superposition voltage to an input node of the current control circuit to vary the control current flowing into the current control circuit from the control terminal of the switch controller to thereby vary the switching frequency of the switch controller.

In certain embodiments in accordance with this aspect, increasing the switching frequency decreases the load current; and decreasing the switching frequency increases the load current.

In certain embodiments in accordance with this aspect, the method increases the superposition voltage when the sensed magnitude of the load current is less than the target load current magnitude; and the method decreases the superposition voltage when the sensed magnitude of the load current is greater than the target load current magnitude.

In certain embodiments in accordance with this aspect, the method further includes generating an increased superposition voltage when the sensed magnitude of the load current is less than the target load current magnitude. The method further includes applying the increased superposition voltage to the input node of the current control circuit to generate a decreased control current flowing into the current control circuit from the control terminal of the switch controller. The method further includes the switch controller reducing the switching frequency in response to the decreased control current, to thereby increase the magnitude of the load current.

In certain embodiments in accordance with this aspect, the method further includes generating a decreased superposition voltage when the sensed magnitude of the load current is greater than the target load current magnitude. The method further includes applying the decreased superposition voltage to the input node of the current control circuit to generate an increased control current flowing into the current control circuit from the control terminal of the switch controller. The method further includes the switch controller increasing the switching frequency to thereby decrease the magnitude of the load current.

Another aspect of the embodiments disclosed herein is a system for controlling the current through a DC load. The system comprises a switch controller having a first output and a second output, each output having an active state and an inactive state. The switch controller is configured to turn on only one of the outputs to the respective active state at any time. The switch controller is further configured to switch the first and second outputs at an operating frequency. The switch controller is responsive to a control current on a control input to vary the operating frequency. A first semiconductor switch has a control input connected to the first output of the switch controller. The first semiconductor switch has a first terminal connected to a first voltage rail and has a second terminal connected to a common switch node. A second semiconductor switch has a control input connected to the second output of the switch controller. The second semiconductor switch has a first terminal connected to the common switch node and has a second terminal connected to a second voltage rail. An isolation transformer has a primary winding AC-coupled between the common switch node and the second voltage rail. The isolation transformer has a secondary winding connected to an AC-to-DC rectifier. The AC-to-DC rectifier provides a load current that flows through the DC load. A current sensor generates a sensor signal having a magnitude responsive to a magnitude of the load current. A comparator has a first input coupled to receive the sensor signal and has a second input that receives a reference magnitude. The comparator has an output that generates a feedback signal responsive to a difference between the magnitude of the sensor signal and the reference magnitude. A current control circuit is coupled to the control input of the switch controller. The current control circuit comprises at least a first resistor in series with a second resistor between the control input and a voltage reference. The current control circuit further comprises an input node at a junction between the first resistor and the second resistor. A voltage superposition circuit has an input and an output. The output of the voltage superposition circuit is connected to the input node of the current control circuit. The input of the voltage superposition circuit is connected to the output of the comparator. The voltage superposition circuit comprises an optocoupler having an input stage coupled to the input of the voltage superposition circuit. The optocoupler has an output stage having a variable impedance responsive to the feedback signal. The output stage of the optocoupler is connected in series with at least one resistor between a supply voltage and the input node of the current control circuit to superimpose a variable voltage on the input node of the current control circuit.

In certain embodiments in accordance with this aspect, the load current increases when the variable frequency decreases; and the load current decreases when the variable frequency increases.

In certain embodiments in accordance with this aspect, the voltage superposition circuit has at least a first state when the output stage of the optocoupler has a minimum impedance. The voltage superposition circuit has at least a second state when the output stage of the optocoupler has a maximum impedance. The superposition circuit applies a maximum superposition voltage to the input node of the current control circuit when the superposition circuit is in the first state. The current control circuit is responsive to the maximum superposition voltage to enable a minimum current to flow out of the control input of the switch controller. The superposition circuit applies no superposition voltage to the input node of the current control circuit when the superposition circuit is in the second state. The current control circuit is responsive to the absence of the superposition voltage to enable a maximum current to flow out of the control input of the switch controller.

In certain embodiments in accordance with this aspect, the switch controller is responsive to the minimum current flowing out of the control input to operate at a minimum variable frequency. The switch controller is responsive to the maximum current flowing out of the control input to operate at a maximum variable frequency.

In certain embodiments in accordance with this aspect, the voltage superposition circuit has at least a third state when the output stage of the optocoupler has an impedance between the minimum impedance and the maximum impedance. The superposition circuit applies a mid-range superposition voltage to the node of the current control circuit. The mid-range superposition voltage has a magnitude less than the maximum voltage. The current control circuit is responsive to the mid-range superposition voltage to enable a mid-range current to flow out of the control input of the switch controller. The switch controller is responsive to the mid-range current flowing out of the control input to operate at a mid-range frequency between the maximum variable frequency and the minimum variable frequency.

BRIEF DESCRIPTIONS OF THE SEVERAL VIEWS OF THE DRAWINGS

DETAILED DESCRIPTION

Reference will now be made in detail to embodiments of the present disclosure, one or more drawings of which are set forth herein. Each drawing is provided by way of explanation of the present disclosure and is not a limitation. It will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

It is intended that the present disclosure covers such modifications and variations as come within the scope of the appended claims and their equivalents. Other objects, features, and aspects of the present disclosure are disclosed in the following detailed description. It is to be understood by one of ordinary skill in the art that the present discussion is a description of exemplary embodiments only and is not intended as limiting the broader aspects of the present disclosure.

Figure 1:
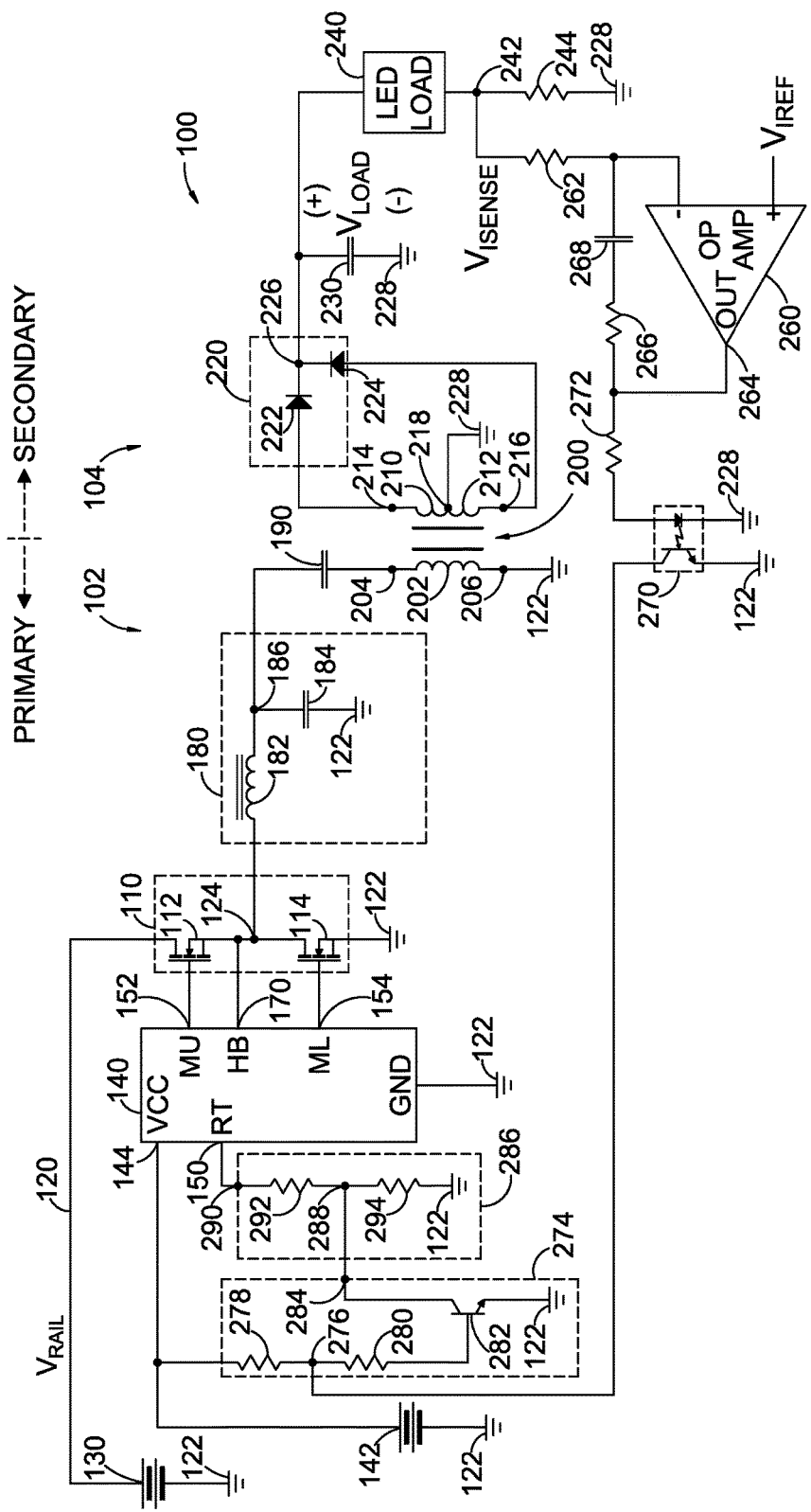
FIG. 1 illustrates a half-bridge resonant type DC-DC converter having a sensor that senses a load current in a secondary circuit and having an optocoupler that couples a feedback signal from the secondary circuit to the primary circuit.

FIG. 1 illustrates a half-bridge resonant type DC-DC converter 100, which provides a constant output current to a load. As used herein the constant output current is referenced to a reference magnitude. The reference magnitude may be varied, and the constant output current will track the reference magnitude. The illustrated converter operates over a wide range of output load currents and is stable over the range of load currents. The converter includes a primary circuit 102 and a secondary circuit 104, which are electrically isolated as described below. The converter includes a first switch 112 and a second switch 114 in a half-bridge switching circuit 110. The switches may be, for example, metal oxide semiconductor field effect transistors (MOS-FETs) or bipolar junction transistors (BJTs). In the illustrated embodiment, the two switches are n-channel MOS-FETs. The half-bridge switching circuit is connected between a DC input bus 120 (also labeled as $V_{RAIL}$) and a primary circuit ground reference 122. The DC input bus may be considered as a first voltage rail; and the primary circuit ground reference may be considered as a second voltage rail. The drain of the first switch is connected to the DC input bus. The source of the first switch is connected to the drain of the second switch at a common switched node 124 of the half-bridge switching circuit. The source of the second switch is connected to the primary circuit ground reference.

In the illustrated embodiment, the voltage on the DC input bus 120 is provided by a first DC voltage source 130. In the illustrated embodiment, the first DC voltage source is illustrated as a battery; however, it should be understood that the voltage on the DC input bus may be provided by other sources such as a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch 112 and the second switch 114 has a respective control input terminal. In the illustrated embodiment incorporating MOSFETs, the control input terminals are the gates of the two transistors. The control input terminals are driven by a self-oscillating half-bridge gate driver integrated circuit (IC) 140, which may also be referred to as a switch controller. In an illustrated embodiment, the driver IC (switch controller) may be, for example, an NCP1392B high-voltage half-bridge driver with inbuilt oscillator, which is commercially available from ON Semiconductor Company of Phoenix, Ariz. The driver IC is powered by a second DC voltage source 142 via a $V_{CC}$ input pin 144. In FIG. 1, the second DC voltage source is illustrated as a battery that provides a voltage $V_{CC}$; however, it should be understood that the second DC voltage source may also be derived from an AC source.

The driver IC (switch controller) 140 is responsive to a timing resistance connected to a timing terminal (RT) 150 to alternately apply an upper drive voltage on an upper drive terminal (MU) 152 and apply a lower drive voltage to a lower drive terminal (ML) 154. The upper output drive voltage is applied to the control input terminal of the first switch 112. The lower output drive voltage is applied to the control input terminal of the second switch 114. When the resistance applied to the timing terminal of the driver IC increases, the current flowing out of the timing terminal decreases, which causes the frequency of the drive voltages applied to the two switches to decrease. When the resistance applied to the timing terminal of the driver IC decreases, the current flowing out of the timing terminal increases, which causes the frequency of the drive voltages to increase. The driver IC may include other terminals that are not shown in FIG. 1.

The common switched node 124 of the half-bridge switching circuit 110 is connected to a half-bridge connection terminal (HB) 170 of the driver IC 140. The common switched node is also connected to a first terminal of a resonant inductor 182 in a resonant circuit 180. A second terminal of the resonant inductor is connected to a first terminal of a resonant capacitor 184 at an output node 186 in the resonant circuit. A second terminal of the resonant capacitor is connected to the primary circuit ground reference 122. The resonant inductor and the resonant capacitor are the main resonant components of the resonant circuit, which is driven by the alternatingly connecting the common switched node to the DC bus 120 via the first switch 112 and to the primary circuit ground reference via the second switch 114.

The output node 186 of the resonant circuit 180 is connected to a first terminal of a DC blocking capacitor 190. A second terminal of the DC blocking capacitor is connected to a first terminal 204 of a primary winding 202 of an output isolation transformer 200. A second terminal 206 of the primary winding of the output isolation transformer is connected to the primary circuit ground reference 122. The foregoing components on the primary circuit 102 of the half-bridge switching circuit 110 operate as a DC-to-AC inverter to produce an AC voltage across the primary winding of the output isolation transformer.

The output isolation transformer 200 includes a first secondary winding 210 and a second secondary winding 212. The two secondary windings are electrically isolated from the primary winding 202. As illustrated, the primary winding is electrically part of the primary circuit 102, and the secondary windings are electrically part of the secondary circuit 104. The two secondary windings have respective first terminals, which are connected at a center tap 218.

Respective second terminals 214, 216 of the first and second secondary windings are connected to input terminals of a half-bridge rectifier 220. The half-bridge rectifier comprises a first rectifier diode 222 and a second rectifier diode 224. The second terminal of the first secondary winding is connected to the anode of the first rectifier diode. The second terminal of the second secondary winding is connected to the anode of the second rectifier diode. The cathodes of the two rectifier diodes are connected together at an output node 226 of the half-bridge rectifier. The center tap of the first and second secondary windings is connected to a secondary circuit ground reference 228. In other embodiments having a single, non-center-tapped secondary winding, the half-bridge rectifier with the two rectifier diodes may be replaced with a full-bridge rectifier with four rectifier diodes.

The output node 226 of the half-bridge rectifier 220 is connected to a first terminal of an output filter capacitor 230. A second terminal of the output filter capacitor is connected to the secondary circuit ground reference 228. A load voltage ($V_{LOAD}$) is developed across the output filter capacitor at the output node of the half-bridge rectifier. The output node of the half-bridge rectifier is also connected to a first terminal of a load 240, which may comprise, for example, one or more light-emitting diodes (LEDs) that emit light when sufficient current passes through the LEDs. A second terminal of the load is connected to a current sensing node 242 and to the first terminal of a current sensing resistor 244. A second terminal of the current sensing resistor is connected to the secondary circuit ground reference. When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm (0.1Ω) such that the effect of the resistance of the current sensing resistor on the load current is insignificant.

When the driver IC 140 operates to apply alternating drive voltages to the first switch 112 and the second switch 114, an AC voltage develops across the resonant capacitor 184. The voltage across the resonant capacitor may include a DC component; however, the DC blocking capacitor 190 transfers only the AC component of the energy stored in the resonant capacitor to the primary winding 202 of the output isolation transformer 200. The transferred energy is magnetically coupled from the primary winding to the electrically isolated first and second secondary windings 210, 212. The first and second rectifier diodes 222, 224 in the half-bridge rectifier 220 rectify the AC energy from the secondary windings into DC energy, which is provided on the output node 226. The DC energy is stored in the output filter capacitor 230 at a voltage determined by the amount of stored energy. Current from the output filter capacitor is provided to the load 240 at a magnitude determined by the voltage on the half-bridge rectifier output node and the resistance of the load.

Because the intensity of the light emitted by the LEDs in the load 240 is dependent on the magnitude of the current flowing through the LEDs, the current is controlled closely. The current sensing resistor 244 senses the current going through the load and develops a voltage $V_{ISENSE}$ on the current sensing node 242 proportional to the load current. The voltage representing the sensed current is fed back to a proportional integral (PI) current control loop to provide current regulation. In FIG. 1, the PI current control loop includes an operational amplifier (OPAMP) 260 having an inverting (−) input terminal, having a non-inverting (+) input terminal, and having an output (OUT) on an output terminal 264. The current sensing node is connected to the inverting input of the operational amplifier via a series resistor 262. A feedback resistor 266 and a feedback capacitor 268 are connected in series between the output terminal of the operational amplifier and the inverting input. A reference voltage ($V_{IREF}$) having a magnitude corresponding to a reference current ($I_{REF}$) is connected to the non-inverting input of the operational amplifier. The magnitude of the reference current and thus the magnitude of the reference voltage are selected to produce a desired load current through the load. The reference current may be a fixed reference current to provide a constant load current, or the reference current may be a variable reference current to allow the load current to be varied to thereby change the intensity of the light emitted by the LEDs in the load. As indicated above, the load current is maintained constant relative to the reference current. If the reference current changes to a new magnitude, the load current is maintained constant relative to the new magnitude. The operational amplifier is responsive to a difference in the magnitudes of the reference voltage $V_{IREF}$ and the sensed voltage $V_{ISENSE}$ to generate a feedback signal. The feedback signal is used to control the operational frequency of the driver IC 140 as described below. The operational amplifier may also be considered as a comparator because the operational amplifier compares the magnitudes of the two input signals and generates an output signal having a magnitude responsive to a difference between the magnitudes of the two input signals.

The output terminal 264 of the operational amplifier 260 is connected to the input stage of an optocoupler 270 via a series resistor 272. The optocoupler may also be referred to as an opto-isolator, an optical isolator or a photocoupler. The input stage of the optocoupler has an internal light generation device (e.g., an LED) coupled to the input of the optocoupler. The light generation device is responsive to a voltage applied to the input stage to generate light. The applied voltage is referenced to the secondary circuit ground reference 228 to which the light generation stage is connected. The generated light is propagated internally to a light-responsive base of a phototransistor in an output stage within the same component. The phototransistor has an emitter and a collector. The emitter is connected to the primary circuit ground reference 122. The impedance of the phototransistor between the collector and the emitter in the output stage of the optocoupler is responsive to the light generated by the input stage. Thus, the impedance of the output stage is responsive to the voltage applied to the input stage. In the illustrated embodiment, increasing the voltage applied to the input stage decreases the impedance of the output stage, and decreasing the voltage applied to the input stage increases the impedance of the output stage. The optocoupler electrically isolates the secondary circuit voltages and the secondary circuit ground reference in the secondary circuit 104 from the primary circuit voltages and the primary circuit ground reference in the primary circuit 102.

The collector of the phototransistor in the output stage of the optocoupler 270 is connected to an input node 276 of an impedance control circuit 274. The impedance control circuit includes a first impedance control resistor 278, a second impedance control resistor 280, an NPN bipolar transistor 282 and an output node 284. The first impedance control resistor is connected from the impedance control input node to the second DC voltage source 142. The second impedance control resistor is connected from the impedance control circuit input node to the base of the bipolar transistor and is referred to hereafter as the base resistor. The emitter of the bipolar transistor is connected to the primary circuit ground reference 122. The collector of the bipolar transistor is connected to the impedance control circuit output node.

The output node 284 of the impedance control circuit 274 is connected to the input node 288 of a current control circuit 286. The current control circuit has an output node 290. The current control circuit comprises a first current control resistor 292 connected between the current control circuit output node and the current control circuit input node. The current control circuit further comprises a second current control resistor 294 connected between the current control circuit input node and the primary circuit ground reference 122. The current control circuit output node is connected to the timing terminal (RT) 150 of the driver IC 140.

As described below, the impedance of the series combination of the first current control resistor 292 and the second current control resistor 294 in the current control circuit 286 operates as the primary impedance to control the current flowing from the timing terminal (RT) 150 of the driver IC 140 and to thereby control the operating frequency of the driver IC. The impedance control circuit 274 operates to modify the impedance of the current control circuit to vary the operating frequency of the driver IC in response to the feedback from the secondary circuit 104 via the optocoupler 270.

When the voltage applied to the input of the optocoupler 270 increases, the effective impedance of the phototransistor in the output stage of the optocoupler decreases to reduce the voltage on the impedance control circuit input node 276. The reduced voltage on the impedance control circuit input node reduces the base current applied to the bipolar transistor 282, which increases the impedance of the bipolar transistor. The increased impedance of the bipolar transistor is in parallel with the second current control resistor 294 in the current control circuit 286. The increased impedance of the bipolar transistor increases the overall impedance between the timing terminal (RT) 150 of the driver IC 140 and the primary circuit ground reference 122. The increased overall impedance reduces the current flowing from the timing terminal to the primary circuit ground reference. The driver IC is responsive to the reduced current to decrease the oscillating frequency.

When the voltage applied to the input of the optocoupler 270 decreases, the effective impedance of the phototransistor in the output stage of the optocoupler increases to increase the voltage on the impedance control circuit input node 276. The increased voltage on the impedance control circuit input node increases the base current applied to the bipolar transistor 282, which decreases the impedance of the bipolar transistor. The decreased impedance of the bipolar transistor in parallel with the second current control resistor 294 decreases the overall impedance between the timing terminal (RT) 150 of the driver IC 140 and the primary circuit ground reference 122. The decreased overall impedance increases the current flowing from the timing terminal to the primary circuit ground reference. The driver IC is responsive to the increased current to decrease the oscillating frequency.

The illustrated driver IC 140 has a fixed deadtime between turning off one of the switched outputs and turning on the other of the switched outputs. The fixed deadtime causes the duty cycle of the on-time of each of the first and second switches 112, 114 to decrease with increased frequency and to increase with decreased frequency. A decrease in duty cycle causes the energy transferred to the load to decrease. An increase in duty cycle causes the energy transferred to the load to increase. Thus, the load current decreases with increased switching frequency, and the load current increases with decreased switching frequency.

From the foregoing, it can be seen that when the current through the current sensing resistor 244 generates a voltage $V_{ISENSE}$ that is less than the voltage $V_{IREF}$ corresponding to the reference current $I_{REF}$, the output voltage of the operational amplifier 260 increases. The increased output voltage produced by the operational amplifier causes the optocoupler 270 to increase the light generated between the input stage and the output stage, which causes the phototransistor in the output stage to increase conductivity and thus decrease the effective impedance of the output stage. This causes the voltage on the impedance control circuit input node 276 to decrease, which increases the impedance of the bipolar transistor 282. The increased impedance of the bipolar transistor decreases the current flowing out of the timing terminal (RT) 150 of the driver IC 140. The decreased timing current decreases the switching frequency of the driver IC, which increases the duty cycle of each switching voltage applied to the respective control input terminals of the first switch 112 and the second switch 114. The increased duty cycle increases the energy transferred to the output filter capacitor 230. The increased energy transfer increases the voltage on the output node 226, which increases the current flowing through the load.

When the current flowing through the load is greater than the reference current, the opposite transitions occur. The voltage on the output of the operational amplifier 260 decreases. The effective impedance of the output stage (phototransistor) of the optocoupler 270 increases to cause the voltage on the impedance control input node 276 to increase, which decreases the impedance of the bipolar transistor 282. The decreased impedance of the bipolar transistor increases the current flowing out of the timing terminal (RT) 150 of the driver IC 140. The increased timing current increases the switching frequency of the driver IC, which decreases the duty cycle of each switching voltage applied to the respective control input terminals of the first switch 112 and the second switch 114. The decreased duty cycle decreases the energy transferred to the output filter capacitor 230. The decreased energy transfer decreases the voltage on the output node 226, which decreases the current flowing through the load.

As described above, the feedback from the secondary circuit 104 to the primary circuit 102 via the current sensing resistor 244, the operational amplifier 260, the optocoupler 270 and the impedance control circuit 274 forms a proportional-integral (PI) loop that maintains the magnitude of the load current substantially equal to the magnitude of the reference current by decreasing the operating frequency to increase the load current when the sensed current is too low and by increasing the operating frequency to decrease the load current when the sensed current is too high.

The operation of the PI loop described above is affected by the DC gain of the bipolar transistor 282 in the impedance control circuit 274. The operating frequency $f_{OP}$ of the driver IC 140 is proportional to the current flowing out of the timing terminal (RT) 150 as follows:

$$f_{OP} = \frac{V_{REF}}{R_{RT}} \times K = K \times I_{RT} \qquad (1)$$

In Equation (1), K is a constant; $V_{REF}$ is an internal voltage reference within the driver IC 140, which in the illustrated embodiment is approximately 3.5 volts; and $R_{RT}$ is the effective total resistance connected between the timing terminal (RT) and the primary circuit ground reference 122. Accordingly, $I_{RT}$ is the timing control current flowing through the effective total resistance $R_{RT}$. The effective total resistance $R_{RT}$ can be calculated by first calculating a parallel impedance of a resistance $R_{294}$ of the second current control resistor 294 and a collector-emitter impedance $R_Q$ of the bipolar transistor 282. The parallel impedance is connected in series with a resistance $R_{292}$ of the first timing resistor 292, which results in the following calculation for the effective total resistance $R_{RT}$:

$$R_{RT} = \frac{1}{\frac{1}{R_{294}} + \frac{1}{R_Q}} + R_{292} \qquad (2)$$

The collector-emitter impedance $R_Q$ of the bipolar transistor 282 is calculated as the collector-emitter voltage ($V_{CE}$) divided by the collector current ($I_C$). Thus, Equation (2) can be rewritten as follows:

$$R_{RT} = \frac{1}{\frac{1}{R_{294}} + \frac{1}{R_Q}} + R_{292} = \frac{1}{\frac{1}{R_{294}} + \frac{V_{CE}}{I_C}} + R_{292} \qquad (3)$$

The collector current (IC) is responsive to the base current ($I_B$) times the beta ($\beta$) of the bipolar transistor 282, where $\beta$ is the DC gain of the bipolar transistor. $\beta$ may be around 1,000 for certain bipolar transistors. Equation (3) can be rewritten as follows:

$$R_{RT} = \frac{1}{\frac{1}{R_{294}} + \frac{1}{R_Q}} + R_{292} = \frac{1}{\frac{1}{R_{294}} + \frac{V_{CE}}{\beta \times I_B}} + R_{292} \qquad (4)$$

The base current $I_B$ is determined by the base voltage and the base resistor (second impedance control resistor) 280. The base voltage is a node voltage ($V_{NODE}$) at the impedance control circuit input node 276. Thus, Equation (4) can be rewritten as follows:

$$R_{RT} = \frac{1}{\frac{1}{R_{294}} + \frac{1}{R_Q}} + R_{292} = \frac{1}{\frac{1}{R_{294}} + \frac{V_{CE}}{\beta \times \left[\frac{V_{NODE}}{R_{280}}\right]}} + R_{292} \qquad (5)$$

The node voltage $V_{NODE}$ is determined by a voltage divider comprising a resistance $R_{278}$ of the first impedance control resistor 278 in series with the parallel impedance of the resistance $R_{280}$ of the base resistor 280 and an output impedance $R_{270}$ of the output stage of the optocoupler 270. In the illustrated embodiment, the resistance of the base resistor is much greater than the output impedance of the output stage of the optocoupler (e.g., $R_{280} \gg R_{270}$) when the optocoupler is turned on. Thus, the voltage divider is effectively the first impedance control resistor connected in series with the output impedance of the output stage of the optocoupler, and $V_{NODE}$ is the voltage across the output impedance of the output stage of the optocoupler. Substituting for $V_{NODE}$ in Equation (5) results in the following:

$$R_{RT} = \frac{1}{\frac{1}{R_{294}} + \frac{1}{R_Q}} + R_{292} = \frac{1}{\frac{1}{R_{294}} + \frac{1}{\beta \times \left[\frac{V_{CC} \times \frac{R_{270}}{R_{278} + R_{270}}}{R_{280}}\right]}} + R_{292} \qquad (6)$$

As shown in Equation (6), the effective total resistance $R_{RT}$ can be adjusted by controlling the collector-emitter impedance $R_Q$ of the bipolar transistor 282. Since the operating frequency $f_{OP}$ is responsive to the effective total resistance $R_{RT}$, the operating frequency is also controlled by the collector-emitter impedance of the bipolar transistor. When the collector-emitter impedance of the bipolar transistor increases, the total impedance increases, and the frequency decreases. Conversely, when the collector-emitter impedance of the bipolar transistor decreases, the total impedance decreases, and the frequency increases.

As further shown in Equation (6), the collector-emitter impedance $R_Q$ of the bipolar transistor 282 is responsive to the combination of the fixed supply voltage ($V_{CC}$), the fixed resistance $R_{278}$ of the first impedance control resistor 278, the fixed resistance $R_{280}$ of the base resistor 280, and the variable output impedance $R_{270}$ of the optocoupler 270. When the output impedance of the optocoupler decreases, the collector-emitter impedance of the bipolar transistor increases. When the output impedance of the optocoupler increases, the collector-emitter impedance of the bipolar transistor decreases.

The previously described PI loop control of the operating frequency $f_{OP}$ can also be understood in view of the impedance changes in the optocoupler 270 and the bipolar transistor 282. When the operating frequency is too high such that the load current is too low, the operational amplifier 260 responds to the sensed low current to increase the voltage on the output terminal 264 of the operational amplifier. The higher voltage applied to the input stage of the optocoupler 270 causes the impedance of the output stage of the optocoupler to decrease. The decreased impedance of the output stage of the optocoupler causes the collector-emitter impedance $R_Q$ of the bipolar transistor to increase, which increases the effective total resistance $R_{RT}$. The increased total impedance causes less current to flow from the timing terminal (RT) 150 of the driver IC 140. Thus, the operating frequency decreases and the load current increases.

When the operating frequency $f_{OP}$ is too low such that the load current is too high, the operational amplifier 260 responds to the sensed high current to decrease the voltage on the output terminal 264 of the operational amplifier. The reduced voltage applied to the input stage of the optocoupler 270 causes the impedance of the output stage of the optocoupler to increase. The increased impedance of the output stage of the optocoupler causes the collector-emitter impedance $R_Q$ of the bipolar transistor 282 to decrease, which decreases the effective total resistance $R_{RT}$. The decreased total impedance causes more current to flow from the timing terminal (RT) 150 of the driver IC 140. Thus, the operating frequency increases and the load current decreases.

Figure 2:
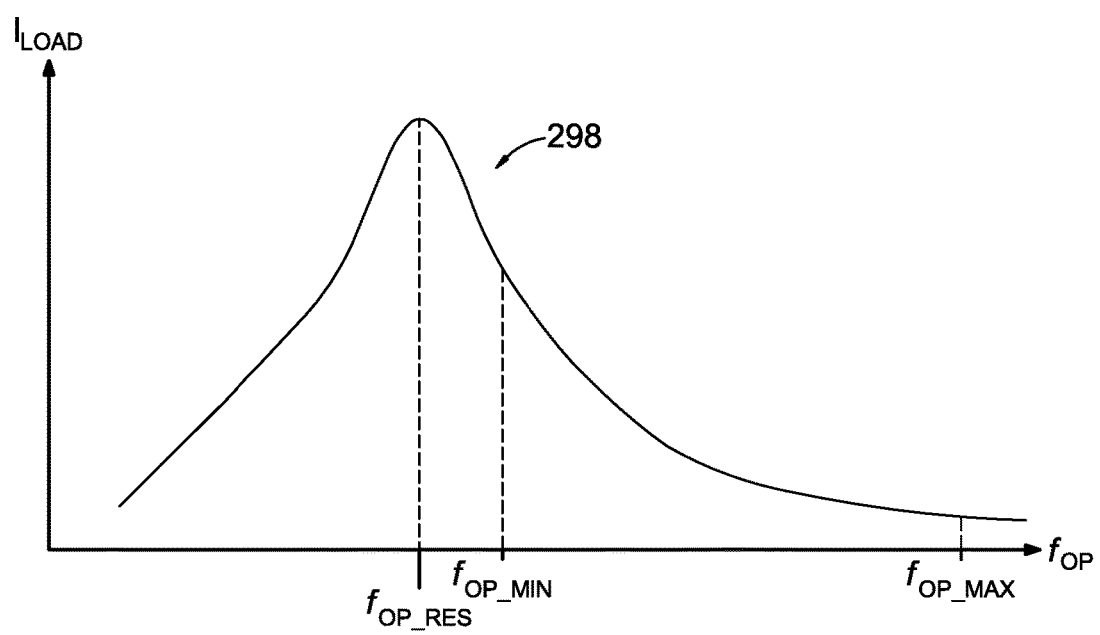
FIG. 2 illustrates a graph of the load current $I_{LOAD}$ versus the operating frequency $f_{OP}$ of the half-bridge resonant type DC-DC converter of FIG. 1.

The relationship of the operating frequency $f_{OP}$ and the current $I_{LOAD}$ through the load 240 is illustrated by a graph 298 in FIG. 2. The operating frequency varies between a minimum operating frequency ($f_{OP\_MIN}$) and a maximum operating frequency ($f_{OP\_MAX}$). The minimum operating frequency is greater than the resonant frequency ($f_{OP\_RES}$) of the resonant circuit 180. The operating frequency of the driver IC 140 increases as the load current decreases, and the operating frequency decreases as the load current increases. For example, in one embodiment, the DC-to-DC converter 100 of FIG. 1 is configured to operate at a minimum operating frequency ($f_{OP\_MIN}$) of about 119 kHz at a maximum load current and to operate at a maximum operating frequency ($f_{OP\_MAX}$) of approximately 186 kHz at a minimum load current.

The half-bridge resonant type DC-DC converter 100 illustrated in FIG. 1 and described above works well; however, as shown in Equation (6), the impedance $R_Q$ of the bipolar transistor 282 is sensitive to the base drive voltage $V_{NODE}$ because of the large DC gain (e.g., β=1,000) of the bipolar transistor. Thus, the impedance of the bipolar transistor is sensitive to noise on the base drive voltage $V_{NODE}$ and other subtle changes in the base drive voltage. Accordingly, the effective total resistance $R_{RT}$ is also sensitive to the base drive voltage. Because the base drive voltage is responsive to the output impedance $R_{270}$ of the optocoupler 270, the effective total resistance $R_{RT}$ is sensitive to the output impedance of the optocoupler. The sensitivity of the effective total resistance $R_{RT}$ to the base drive voltage can cause unacceptable flickering of the LEDs of the load 240 during normal operation of the DC-DC converter 100.

Figure 3:
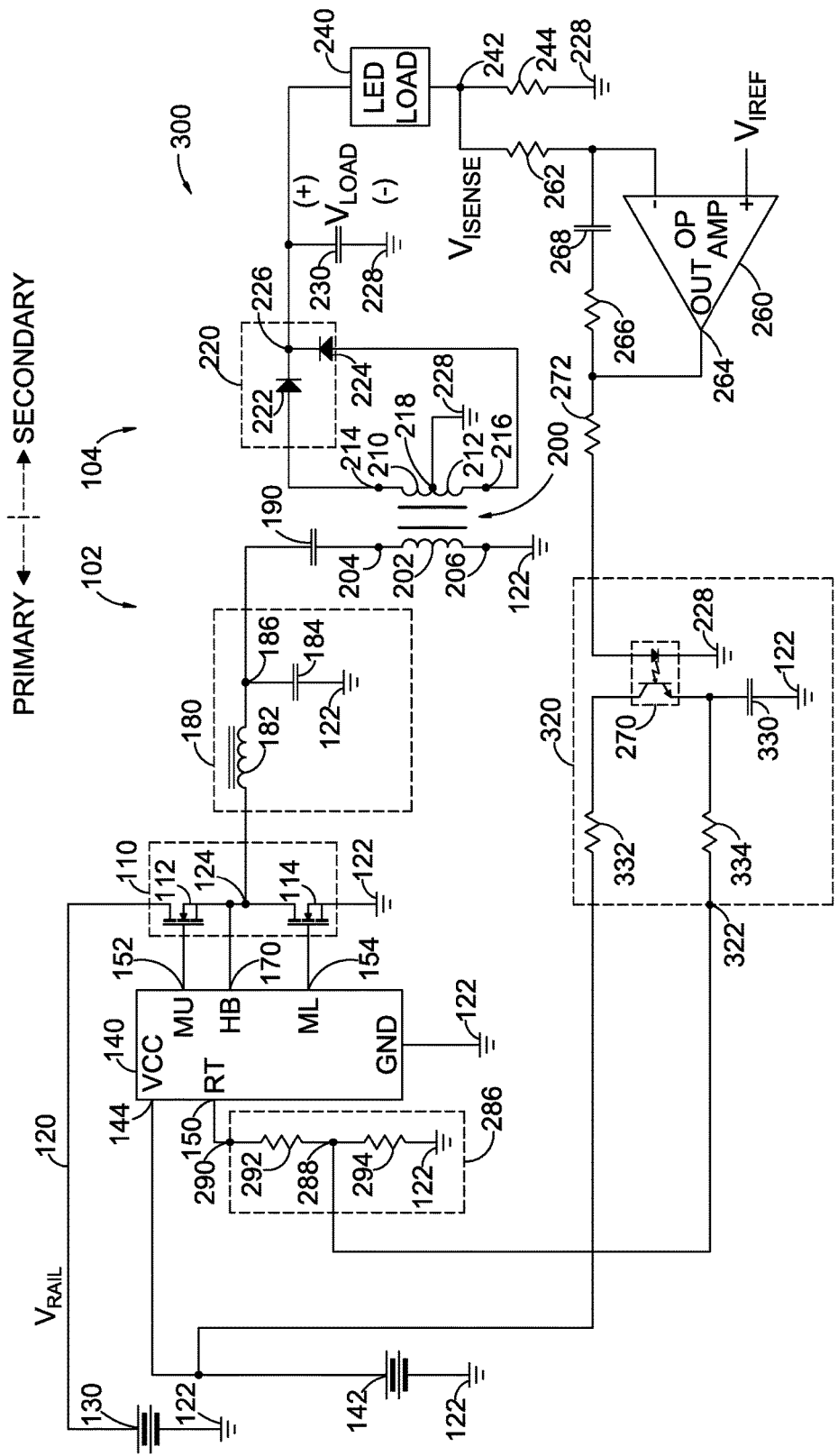
FIG. 3 illustrates a modified half-bridge resonant type DC-DC converter, which includes a voltage superposition block to control the operating frequency of a driver IC in the primary circuit of the DC-DC converter.

FIG. 3 illustrates a modified half-bridge resonant type DC-DC converter 300, which incorporates a revised frequency control method that reduces the effect of the output impedance of the optocoupler 270 on the load current. As described below, the DC-DC converter of FIG. 3 uses voltage superposition to control the operating frequency $f_{OP}$.

The modified half-bridge resonant type DC-DC converter 300 of FIG. 3 has certain components corresponding to components in the half-bridge resonant type DC-DC converter 100, which operate in the same or similar manner. The corresponding components are identified with the same reference numbers in FIG. 3 as in FIG. 1.

In the modified half-bridge resonant type DC-DC converter 300 of FIG. 3, the output node 290 of the current control circuit 286 is connected to the timing terminal (RT) 150 as in FIG. 1. The first current control resistor 292 is connected between the current control circuit output node and the current control circuit input node 288. The second current control resistor 294 is connected between the current control circuit input node and the primary circuit ground reference 122. Rather than being connected to the output node 284 of impedance control circuit 274 as in FIG. 1, the current control circuit input node in FIG. 3 is connected to an output node 322 of a voltage superposition circuit 320.

The voltage superposition circuit 320 includes the optocoupler 270, which has the input stage connected to the output terminal 264 of the operational amplifier 260 via the series resistor 272 as described above. The voltage superposition circuit further includes a filter capacitor 330, a pullup resistor 332 and an output resistor 334.

The collector of the output stage of the optocoupler 270 is connected to the second DC voltage source 142 via the pullup resistor 332. The emitter of the output stage of the optocoupler is connected to the primary circuit ground reference 122 via the filter capacitor 330. The emitter of the output stage of the optocoupler is also connected to the output node 322 of the voltage superposition circuit 320 via the output resistor 334. The output node of the voltage superposition circuit is connected to the current control circuit input node 288 as described above.

The voltage superposition circuit 320 and the timing control circuit 286 of the half-bridge resonant type DC-DC converter 300 of FIG. 3 operate together to control the current from the timing terminal (RT) 150 of the driver IC 140 and to thereby control the operating frequency of the driver IC as described in the following paragraphs.

As described above, the operating frequency of the driver IC 140 is responsive to the timing current $I_{RT}$ flowing out of the timing terminal (RT) 150 of the driver IC. In the modified half-bridge resonant type DC-DC converter 300 of FIG. 3, the timing current is defined as:

$$I_{RT} = \frac{V_{REF} - V_{CONTROL}}{R_{292}} \quad (7)$$

In Equation (7), $V_{REF}$ is the internal voltage reference within the driver IC 140, which in the illustrated embodiment is approximately 3.5 volts. $V_{CONTROL}$ is a control voltage on the input node 288 of the current control circuit 286. $R_{292}$ is the resistance of the first current control resistor 292. As shown in Equation (7), the timing control current $I_{RT}$ is adjustable by changing the voltage $V_{CONTROL}$ across the second current control resistor 294 with respect to the primary circuit ground reference 122. The control voltage $V_{CONTROL}$ is also referred to herein as a superposition voltage. The voltage superposition circuit 320 controls the control voltage $V_{CONTROL}$ on the current control circuit input node in the following manner.

The control voltage $V_{CONTROL}$ is defined using the superposition principal as follows:

$$V_{CONTROL} = \quad (8)$$

$$\left[ V_{CC} \times \frac{\frac{R_{292} \times R_{294}}{R_{292} + R_{294}}}{R_{332} + R_{270} + R_{334} + \frac{R_{292} \times R_{294}}{R_{292} + R_{294}}} \right] + \left[ V_{REF} \times \frac{R_{294}}{R_{292} + R_{294}} \right]$$

As set forth above in Equation (1):

$$f_{OP} = \frac{V_{REF}}{R_{RT}} \times K = K \times I_{RT}$$

Substituting Equation (7) for the timing control current $I_{RT}$ in Equation (1) results in the following calculation for the operating frequency $f_{OP}$:

$$f_{OP} = K \times \frac{V_{REF} - V_{CONTROL}}{R_{292}} \quad (9)$$

Substituting Equation (8) for $V_{CONTROL}$ in Equation (9) results in the following:

$$f_{OP} = K \times I_{RT} = K \times \frac{V_{REF} - \left[ V_{CC} \times \frac{\frac{R_{292} \times R_{294}}{R_{292} + R_{294}}}{R_{332} + R_{270} + R_{334} + \frac{R_{292} \times R_{294}}{R_{292} + R_{294}}} \right] - \left[ V_{REF} \times \frac{R_{294}}{R_{292} + R_{294}} \right]}{R_{292}} \quad (10)$$

As shown in Equations (8) and (10), when the output impedance $R_{270}$ of the output stage of the optocoupler 270 increases, the voltage $V_{CONTROL}$ at the input node 288 of the timing control circuit 286 decreases. The decreased node voltage causes the timing control current $I_{RT}$ to increase. The increased timing control current causes the operating frequency $f_{OP}$ to increase. As discussed above, the output impedance of the output stage of the optocoupler increases when the voltage applied to the input stage of the optocoupler decreases as a result of the load current $I_{LOAD}$ being too high as a result of the operating frequency being too low. Thus, the voltage superposition circuit operates to increase the operating frequency to thereby decrease the load current.

When the output impedance $R_{270}$ of the output stage of the optocoupler 270 decreases, the voltage $V_{CONTROL}$ at the input node 288 of the timing control circuit 286 increases. The increased node voltage causes the timing control current $I_{RT}$ to decrease. The decreased timing control current causes the operating frequency $f_{OP}$ to decrease. As discussed above, the output impedance of the output stage of the optocoupler decreases when the voltage applied to the input stage of the optocoupler increases as a result of the load current $I_{LOAD}$ being too low as a result of the operating frequency being too high. Thus, the voltage superposition circuit operates to decrease the operating frequency to thereby increase the load current.

The output impedance $R_{270}$ of the output stage of the optocoupler 270 is inversely proportional to the input current $I_{INPUT}$ that flows through the light-emitting diode in the input stage of the optocoupler as follows:

$$R_{270} = \frac{G}{I_{INPUT}} \quad (11)$$

In Equation (11), G is a constant that may be determined experimentally or from datasheets for the optocoupler.

The portions of the DC-DC converter of FIG. 3 common to the DC-to-DC converter 100 of FIG. 1 operate as before such that the operational amplifier 260 increases the voltage on the output terminal 264 when the sensed load current is lower than the reference current and decreases the voltage on the output terminal when the sensed load current is greater than the reference current. As described below, the voltage superposition circuit 320 reduces the effect of minor variations in the output impedance $R_{270}$ of the output stage of the optocoupler 270 on the stability of the load current.

When the voltage on the output terminal 264 of the operational amplifier increases in response to the sensed load current being less than the reference current, the current flowing into the light-emitting diode of the input stage of the optocoupler 270 increases. According to Equation (11), the increased input current causes the output impedance $R_{270}$ of the output stage of the optocoupler to decrease. According to Equation (10), the decreased output impedance of the optocoupler causes the second (middle) term of the right side of Equation (10) to increase (have a greater magnitude). Subtracting the greater magnitude from $V_{REF}$ decreases the right side of Equation (10). Thus, the operating frequency $f_{OP}$ decreases. As discussed above, decreasing the operating frequency increases the energy transfer to thereby increase the load current.

When the voltage on the output terminal 264 of the operational amplifier decreases in response to the sensed load current being greater than the reference current, the current flowing into the light-emitting diode of the input stage of the optocoupler 270 decreases. According to Equation (11), the decreased input current causes the output impedance $R_{270}$ of the output stage of the optocoupler to increase. According to Equation (10), the increased output impedance of the optocoupler causes the second (middle) term of the right side of Equation (10) to decrease (have a smaller magnitude). Subtracting the smaller magnitude from $V_{REF}$ increases the right side of Equation (10). Thus, the operating frequency $f_{OP}$ increases. As discussed above, increasing the operating frequency decreases the energy transfer to thereby decrease the load current.

The maximum operating frequency $f_{OP\_MAX}$ of the modified half-bridge resonant type DC-DC converter 300 in FIG. 3 occurs when the optocoupler 270 is turned completely off such that the voltage $V_{CC}$ from the second DC voltage source 142 is blocked from the input node 288 of a current control circuit 286. Thus, the maximum operating frequency can be determined as follows:

$$f_{OP\_MAX} = K \times \frac{V_{REF}}{R_{292} + R_{294}} \quad (12)$$

In one embodiment, the first current control resistor 292 has a resistance $R_{292}$ of approximately 2,000 ohms (2 kΩ), and the second current control resistor 294 has a resistance $R_{294}$ of approximately 2,700 ohms (2.7 kΩ). The value of K for the driver IC 140 is approximately $250 \times 10^6$, and the internal reference voltage $V_{REF}$ of the driver IC is approximately 3.5 volts. For this example, the maximum operating frequency $f_{OP\_MAX}$ is approximately 186 kHz.

The minimum operating frequency $f_{OP\_MIN}$ of the modified half-bridge resonant type DC converter 300 in FIG. 3 occurs when the optocoupler 270 is fully turned on such that the output impedance of the output stage is very low (e.g., around 100 ohms (100Ω)). The minimum operating frequency can be determined from Equation (10) as follows:

In Equation (13), the output impedance $R_{270}$ of the output stage of the optocoupler 270 when the optocoupler is fully turned on is much less than the resistance $R_{332}$ of the pullup resistor 332 (e.g., $R_{332} \gg R_{270}$) such that the output impedance of the output stage is not a significant factor in Equation (13). Thus, the $R_{270}$ term in Equation (10) is omitted in Equation (13). The modified half-bridge resonant type DC-DC converter 300 of FIG. 3 has a substantially reduced sensitivity to small changes of the output impedance of the output stage of the optocoupler in comparison to the half-bridge resonant type DC-DC converter 100 of FIG. 1. Thus, subtle differences in the output impedance between optocouplers or subtle changes in output impedance over time will not affect the minimum operating frequency $f_{OP\_MIN}$. In one embodiment, the pullup resistor 332 in the voltage superposition circuit 320 has a resistance $R_{332}$ of approximately 4,500 ohms (4.5 kΩ), and the output resistor 334 in the voltage superposition circuit has a resistance of approximately 5,000 ohms (5 kΩ). With the previous approximate values for the first current control resistor 292, the second current control resistor 294 and K, the minimum operating frequency is approximately 119 kHz, which is above the resonant frequency $f_{OP\_RES}$ in FIG. 2.

In the illustrated embodiment, the filter capacitor 330 in the voltage superposition circuit 320 has a capacitance of around 1 microfarad. The filter capacitor operates to further stabilize the control voltage $V_{CONTROL}$ applied to the input node 288 of a current control circuit 286 and to further reduce the sensitivity of the current control circuit 286 to noise and to subtle changes in the output impedance $R_{270}$ of the output stage of the optocoupler 270.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for controlling a load current through a DC load, the system comprising:
    a self-oscillating switch driver integrated circuit (IC) having a first driver output and a second driver output coupled to a first semiconductor switch and a second semiconductor switch, the switch driver IC selectively enabling the first and second semiconductor switches at a variable frequency to generate a switched voltage signal referenced to a primary circuit ground reference, the switch driver IC varying the variable frequency in response to a current magnitude on a control input;
    an isolation transformer having a primary winding configured to receive the switched voltage signal, the isolation transformer having at least one secondary winding that generates a secondary AC voltage responsive to the switched voltage signal received by the primary winding;
    a rectifier circuit connected to the at least one secondary winding of the isolation transformer to receive the secondary AC voltage, the rectifier circuit configured to $$f_{OP\_MIN} = K \times I_{RT} = K \times \frac{V_{REF} - \left[ V_{CC} \times \frac{\frac{R_{292} \times R_{294}}{R_{292} + R_{294}}}{R_{332} + R_{334} + \frac{R_{292} \times R_{294}}{R_{292} + R_{294}}} \right] - \left[ V_{REF} \times \frac{R_{294}}{R_{292} + R_{294}} \right]}{R_{292}} \quad (13)$$

rectify the secondary AC voltage to provide a DC voltage to the DC load to produce the load current through the DC load;

a current sensor that senses a magnitude of the load current to generate a sensor voltage responsive to the magnitude of the load current, the magnitude of the load current responsive to the variable frequency of the switch driver IC;

a feedback generator that outputs a feedback signal responsive to a difference between the sensor voltage and a reference voltage, the reference voltage representing a desired magnitude of the load current;

an optocoupler having an input stage and an output stage, the input stage coupled to receive the feedback signal, the output stage having a variable impedance between a first output terminal and a second output terminal responsive to the feedback signal;

a current control circuit having a first resistor and a second resistor connected in series between the control input of the switch driver IC and the primary circuit ground reference, the current control circuit further including a node between the first resistor and the second resistor; and a voltage superposition circuit connected between a supply voltage and the node of the current control circuit, the voltage superposition circuit including the output stage of the optocoupler in series with at least one resistor, the voltage superposition circuit responsive to the feedback signal received by the input stage to vary the impedance of the output stage to thereby vary a superposition voltage applied to the node of the current control circuit and vary the magnitude of the current on the control input of the switch driver IC, wherein:

the voltage superposition circuit has at least a first state when the output stage of the optocoupler has a minimum impedance;

the voltage superposition circuit has at least a second state when the output stage of the optocoupler has a maximum impedance;

the superposition circuit applies a maximum superposition voltage to the node of the current control circuit when the superposition circuit is in the first state, the current control circuit responsive to the maximum superposition voltage to enable a minimum current to flow out of the control input of the switch driver IC, the switch driver IC is responsive to the minimum current flowing out of the control input to operate at a minimum variable frequency; and the superposition circuit applies no superposition voltage to the node of the current control circuit when the superposition circuit is in the second state, the current control circuit responsive to the absence of the superposition voltage to enable a maximum current to flow out of the control input of the switch driver IC, the switch driver IC is responsive to the maximum current flowing out of the control input to operate at a maximum variable frequency.

2. The system as defined in claim 1, wherein:

the voltage superposition circuit has at least a third state when the output stage of the optocoupler has an impedance between the minimum impedance and the maximum impedance;

the superposition circuit applies a mid-range superposition voltage to the node of the current control circuit, the mid-range superposition voltage having a magnitude less than the maximum voltage, the current control circuit responsive to the mid-range superposition voltage to enable a mid-range current to flow out of the control input of the switch driver IC; and the switch driver IC is responsive to the mid-range current flowing out of the control input to operate at a mid-range frequency between the maximum variable frequency and the minimum variable frequency.

3. A method for controlling a load current through a DC load in a secondary circuit wherein the secondary circuit is isolated from a primary circuit by an isolation transformer, the primary circuit including a DC-to-AC inverter, the DC-to-AC inverter including at least a first semiconductor switch and a second semiconductor switch, the two switches controlled by a switch controller to produce a switched input signal to a primary winding of the isolation transformer, the switch controller controlling the first and second semiconductor switches at a variable operating frequency responsive to a magnitude of a control current flowing out of a control terminal of the switch controller, the control current determined by a current control circuit, the secondary circuit including a secondary winding of the isolation transformer coupled to an AC-to-DC rectifier, the AC-to-DC rectifier providing the load current at a magnitude responsive to the switching frequency, the method comprising:

sensing the load current to generate a sensed load current magnitude;

comparing the sensed load current magnitude to a target load current magnitude;

generating a feedback signal responsive to a difference between the sensed load current magnitude and the target load current magnitude;

applying the feedback signal to a voltage superposition circuit to generate a superposition voltage responsive to the feedback signal; and applying the superposition voltage to an input node of the current control circuit to vary the control current flowing into the current control circuit from the control terminal of the switch controller to thereby vary the switching frequency of the switch controller, wherein the method further comprises:

generating an increased superposition voltage when the sensed magnitude of the load current is less than the target load current magnitude; and applying the increased superposition voltage to the input node of the current control circuit to generate a decreased control current flowing into the current control circuit from the control terminal of the switch controller, the switch controller reducing the switching frequency in response to the decreased control current, to thereby increase the magnitude of the load current.

4. The method as defined in claim 3, further comprising:

generating a decreased superposition voltage when the sensed magnitude of the load current is greater than the target load current magnitude; and applying the decreased superposition voltage to the input node of the current control circuit to generate an increased control current flowing into the current control circuit from the control terminal of the switch controller, the switch controller increasing the switching frequency to thereby decrease the magnitude of the load current.

5. A system for controlling the current through a DC load, the system comprising:

a switch controller having a first output and a second output, each output having an active state and an inactive state, the switch controller configured to turn on only one of the outputs to the respective active state at any time, the switch controller further configured to switch the first and second outputs at an operating frequency, the switch controller responsive to a control current on a control input to vary the operating frequency, wherein:

the switch controller is responsive to the minimum current flowing out of the control input to operate at a minimum variable frequency; and the switch controller is responsive to the maximum current flowing out of the control input to operate at a maximum variable frequency;

a first semiconductor switch having a control input connected to the first output of the switch controller, the first semiconductor switch having a first terminal connected to a first voltage rail and having a second terminal connected to a common switch node;

a second semiconductor switch having a control input connected to the second output of the switch controller, the second semiconductor switch having a first terminal connected to the common switch node and having a second terminal connected to a second voltage rail;

an isolation transformer having a primary winding AC-coupled between the common switch node and the second voltage rail, the isolation transformer having a secondary winding connected to an AC-to-DC rectifier, the AC-to-DC rectifier providing a load current that flows through the DC load;

a current sensor that generates a sensor signal having a magnitude responsive to a magnitude of the load current;

a comparator having a first input coupled to receive the sensor signal and having a second input that receives a reference magnitude, the comparator having an output that generates a feedback signal responsive to a difference between the magnitude of the sensor signal and the reference magnitude;

a current control circuit coupled to the control input of the switch controller, the current control circuit comprising at least a first resistor in series with a second resistor between the control input and a voltage reference, the current control circuit further comprising an input node at a junction between the first resistor and the second resistor; and a voltage superposition circuit having an input and an output, the output of the voltage superposition circuit connected to the input node of the current control circuit, the input of the voltage superposition circuit connected to the output of the comparator, the voltage superposition circuit comprising an optocoupler having an input stage coupled to the input of the voltage superposition circuit, the optocoupler having an output stage having a variable impedance responsive to the feedback signal, the output stage of the optocoupler connected in series with at least one resistor between a supply voltage and the input node of the current control circuit to superimpose a variable voltage on the input node of the current control circuit, wherein:

the voltage superposition circuit has at least a first state when the output stage of the optocoupler has a minimum impedance;

the voltage superposition circuit has at least a second state when the output stage of the optocoupler has a maximum impedance;

the superposition circuit applies a maximum superposition voltage to the input node of the current control circuit when the superposition circuit is in the first state, the current control circuit responsive to the maximum superposition voltage to enable a minimum current to flow out of the control input of the switch controller; and the superposition circuit applies no superposition voltage to the input node of the current control circuit when the superposition circuit is in the second state, the current control circuit responsive to the absence of the superposition voltage to enable a maximum current to flow out of the control input of the switch controller.

6. The system as defined in claim 5, wherein:

the voltage superposition circuit has at least a third state when the output stage of the optocoupler has an impedance between the minimum impedance and the maximum impedance;

the superposition circuit applies a mid-range superposition voltage to the node of the current control circuit, the mid-range superposition voltage having a magnitude less than the maximum voltage, the current control circuit responsive to the mid-range superposition voltage to enable a mid-range current to flow out of the control input of the switch controller; and the switch controller is responsive to the mid-range current flowing out of the control input to operate at a mid-range frequency between the maximum variable frequency and the minimum variable frequency.

* * * * *